May 2, 1961 G. I. HINCKLEY 2,982,387
ROLLER ASSEMBLY
Filed July 9, 1959 2 Sheets-Sheet 1

GARDNER I. HINCKLEY
INVENTOR.

BY *Albert Sperry*

ATTORNEY

May 2, 1961    G. I. HINCKLEY    2,982,387
ROLLER ASSEMBLY
Filed July 9, 1959    2 Sheets-Sheet 2
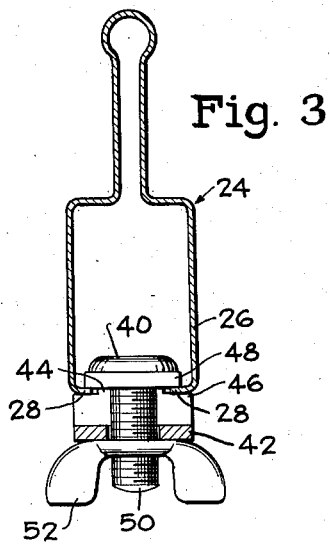
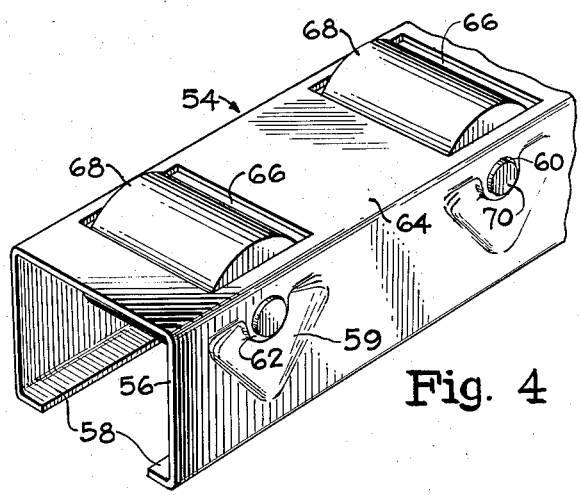
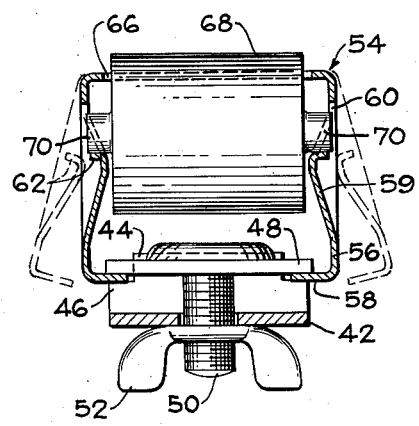
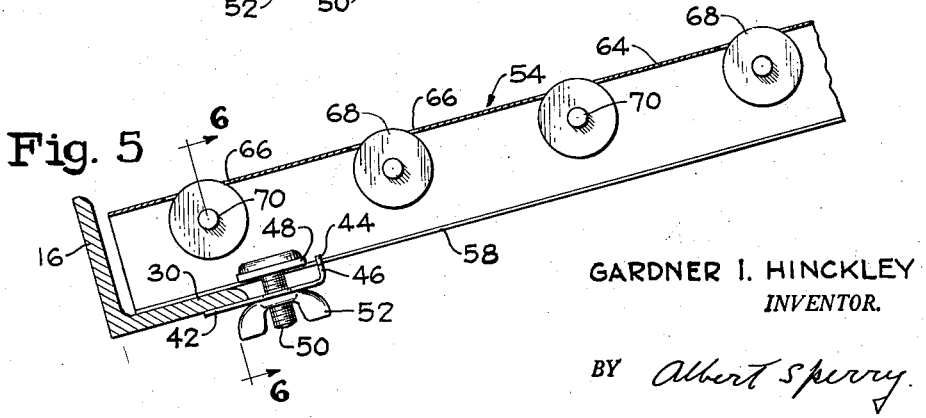
GARDNER I. HINCKLEY
INVENTOR.
BY Albert Sperry
ATTORNEY

United States Patent Office 2,982,387
Patented May 2, 1961

2,982,387
ROLLER ASSEMBLY

Gardner I. Hinckley, Pompton Plains, N.J. assignor, by mesne assignments, to The Grand Union Company, a corporation of New York Filed July 9, 1959, Ser. No. 825,916

2 Claims. (Cl. 193—35)

This invention relates to roller assemblies or tracks for use in moving articles from one position to another and is directed particularly to tracks adapted for use in supporting and moving articles along inclined paths under the action of gravity.

It is common practice to arrange articles in stores, warehouses and elsewhere so that they are movable by gravity along inclined paths or tracks from the rear to the front of display or storage equipment. However, the frictional resistance to the movement of articles along inclined tracks often renders it necessary to tilt the tracks at such an angle that the capacity of the equipment is limited for any given height. In order to overcome this difficulty the tracks are sometimes provided with rollers but the assemblies heretofore provided have been expensive to produce and require frequent lubrication in order to maintain them in operation. Moreover, the lubricant applied to the rollers sometimes comes into contact with the articles causing damage thereto.

In accordance with the present invention the capacity of display or storage equipment is increased and the angle of inclination of the tracks therein is reduced by providing tracks or roller assemblies wherein rollers are mounted in a novel manner to facilitate the movement of articles supported thereby. The roller assemblies of the present invention are characterized by units formed of elongated strips of material which are provided with spaced side walls having supporting shoulders or bearing surfaces thereon upon which are mounted nylon or other rollers that do not require lubrication. The units are readily formed of metal stampings or the like and are adjustably secured in place between guide members on a supporting frame to provide pathways of any desired width required for receiving and guiding articles of varying sizes. In this way the units may be assembled or moved from one position to another to afford the greatest possible adaptability and versatility in use of the equipment.

The principal object of the present invention is to provide a novel type of roller assembly for supporting and moving articles under the action of gravity.

Another object of the invention is to provide units formed of metal stampings or the like and adapted to hold rollers in predetermined positions therein.

A specific object of the invention is to provide a unit having spaced side walls with roller supporting shoulders formed integrally therewith.

Another specific object of the invention is to provide simple and economical means capable of variation in assembly to provide pathways or tracks of varying width for the guiding of articles by gravity from the rear to the front of a stand.

These and other objects and features of the present invention will appear from the following description thereof wherein reference is made to the figures of the accompanying drawing.

In the drawing:

Fig. 3 is a transverse sectional view through a guide strip embodied in the equipment of Fig. 1;

Fig. 4 is an enlarged perspective illustrating a portion of a roller assembly embodying the present invention;

Fig. 5 is a longitudinal sectional view through the assembly of Fig. 2; and

Fig. 6 is a longitudinal sectional view through the construction shown in Fig. 5.

Figure 1:
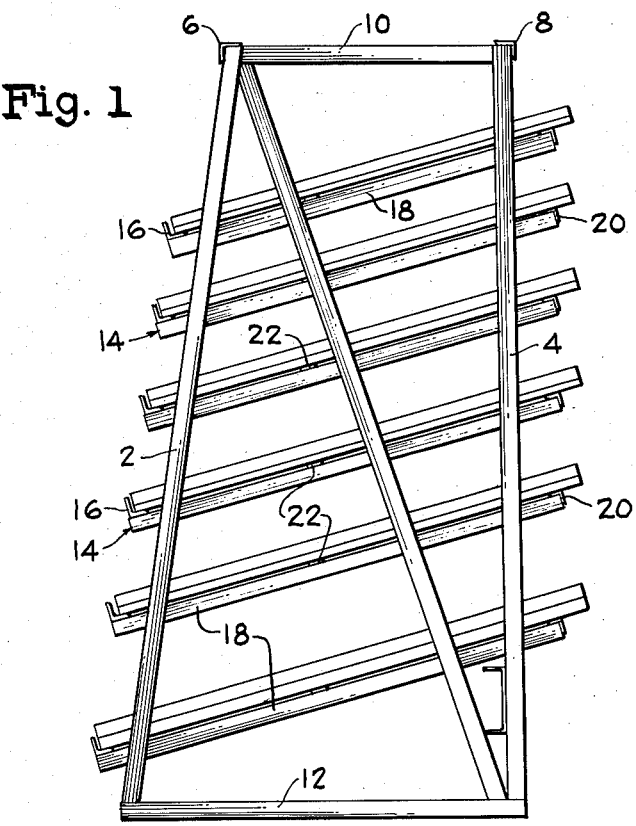
Fig. 1 is a side elevation illustrating a typical form of equipment embodying the present invention.

In that form of the invention chosen for purposes of illustration in the drawing, the equipment is in the form of a stand embodying a framework including front uprights 2 and rear uprights 4 with connecting members 6, 8, 10 and 12 located near the front, rear, top and bottom of the equipment. However, any other suitable form of framework may be used as required in any particular installation. Angle iron shelf frames 14 are mounted on the framework in any desired positions of inclination and as shown each frame embodies a front angle iron stop member 16, side members 18 which also may be formed of angle iron and a rear member 20. Intermediate cross members 22 are also mounted on the shelf frame when the frame is of sufficient size to need intermediate support.

Figure 2:
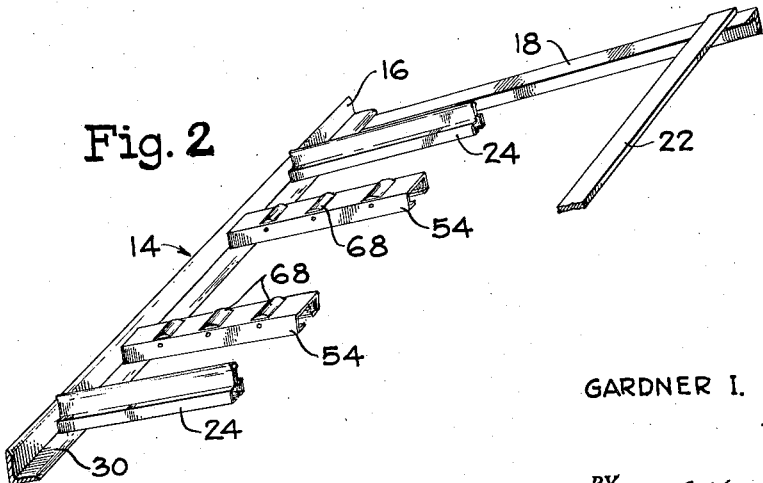
Fig. 2 is a perspective showing a portion of the equipment of Fig. 1.

The pathways along which the articles are moved are preferably defined by guide strips 24 which, as shown in Figs. 2 and 3, may embody a base portion 26 having lower inturned flanges 28 which rest upon the horizontal flange 30 of the front stop member 16 and the intermediate and rear members 22 and 20 respectively of the shelf frames 14. The guide strips are secured to the flanges 30 by attaching means 40 which as shown include a clamping plate 42 having a reduced end 44 which extends upward between the inturned flanges 28 of the base portion. The clamping plate has a clamping end 46 which is wider than the space between the flanges 28 and bears against the lower surfaces thereof. An inner plate 48 bears against the upper surfaces of the flanges 28 and carries a bolt 50 to which a thumb nut 52 is applied. The guide strips may thus be secured to the flanges 30 in any desired location by tightening the thumb nut 52, whereas the guide strips may be loosened and moved to any desired spaced relation for forming pathways of whatever width may be required for receiving articles of any desired size. Moreover, the guide strips are readily movable from one position to another by loosening the thumb nut 52 so that they may be shifted laterally on the frame 14 to alternative positions and thereafter may be secured in place with a minimum of difficulty.

The articles guided along the pathways by the guide strips 24 are supported by supporting roller assemblies 54 of the present invention. These roller assemblies are located between the guide strips 24 in position to support the articles to be moved along the pathways. One, two, three or more roller assemblies may be provided in each pathway as required for supporting the article and they are arranged to extend parallel to the guide strips from the front shelf frame. The roller assemblies are in the form of strips or channeled units and have the lower ends thereof positioned to rest upon the flanges 30 of the front frame member in abutting relation to the upwardly extending stop flange 16. The intermediate and rear portions of the assemblies 54 rest upon and are secured to the intermediate and rear shelf frame members 22 and 20 respectively.

Each assembly 54 is in the form of a strip which preferably is made of metal and is channeled or generally U-shaped in cross-section but inverted as shown in Figs. 4 and 6. The downwardly extending spaced sides 56 of the assembly are formed with inturned lower flanges 58 which rest on the flange 30 of the front member of the shelf frame 14 and upon the intermediate and rear members 22 and 20 of the shelf frame. The assemblies are secured to the shelf frame members by attaching means which, as shown in Figs. 5 and 6, are preferably of the type shown and described above in connection with the guide strips 24.

The spaced sides 56 of the assemblies are formed with opposed and aligned circular openings 60 therein presenting lower laterally extending bearing surfaces 62. These surfaces are formed integral with the side walls 56 from the metal or material punched out of the side walls in forming the openings 60 therein. In this way, smooth, accurately formed bearing surfaces can be provided in a forming or pressing operation by which the strips are given their channeled or U-shaped cross-section. The assemblies can, therefore, be produced economically and the cost thereof is greatly reduced.

The base 64 of the strip or assembly which extends transversely between the sides 56 is formed with roller receiving openings 66 spaced apart lengthwise of the strip in alignment with the openings 60 in the sides of the assembly. Rollers 68 are provided with trunnions or axles 70 which are preferably formed integral with the roller and extend into the openings 60 in the sides 56. The body of each roller extends through one of the openings 66 so as to project above the surface of the base 64 of the assembly into position to support an article positioned in the channel between the guide strips 24.

The portions of the side walls 56 in which the openings 60 are formed are preferably inclined inward toward each other and have the bearing surfaces 62 thereof turned outwardly. Thus as shown the side walls may be formed with depressions 59 located at intervals lengthwise of the strip corresponding to the spacing of the rollers 68 and the location of the openings 60. The inward inclination of the depressions 59 in which the openings 60 are formed serves to present a truss-like support for the rollers 68 and bearing surfaces 62 so as to afford the maximum strength at the inner ends of the bearings 62 adjacent the rollers. Moreover, the pressure applied to the rollers and bearing surfaces 62 tend to urge the inwardly inclined portions 59 of the side walls 56 inward toward the rollers. In this way, the construction provided permits the maximum loading of the rollers while eliminating any tendency for the side walls to spread apart or spread outward under load. The side walls may, of course, be inclined inwardly throughout the length thereof if desired. However, the formation of regularly spaced depressions throughout the length of the strip affords an increase in lateral and longitudinal strength whereby the desired load carrying capacity may be attained when using relatively light gauge metal or material for forming the channeled strips of the assembly.

The diameter of the rollers 68 is greater than the length of the openings 60 in a direction lengthwise of the strip whereas the length of the rollers is less than the width of the openings 60. The rollers are thus securely held in place within the strip by the bearing surfaces 62 and the sides of the openings 60 whereas the rollers are capable of endwise play assuring free movement and rotation thereof.

The rollers 68 are preferably formed as unitary elements made of nylon or other plastic material which requires no lubrication. Such unitary rollers may be assembled with the strips by springing or bending the sides 56 of the strip apart so that they move to the dotted line position of Fig. 6. The rollers can then be readily inserted, and if the strip is inverted from the position shown, the rollers will simply fall into place. Thereafter, when the sides 56 are sprung or bent back to the full line position of Fig. 6, the rollers will be securely held against removal and will be properly mounted on the bearing surfaces 62 of the sides 56.

When the rollers have been inserted in the strips, the strips or roller assemblies are secured in place on the flange 30 and the intermediate and rear members 22 and 20 of the shelf frame 14 by the attaching means 40. The sides 56 of the assembly are then clamped in place by the clamping plates 42 and the inner plates 48 of the attaching means. The sides are thereby held against unintentional spreading or outward flexing and are rigidly held in properly spaced relation to support the rollers 68 throughout the length of the strip. In fact, if any danger of spreading of the sides 56 of the assembly should be encountered by reason of heavy loading thereof, additional attaching means 40 may be applied to the flanges 58 at points between the members of the shelf frame to clamp and hold the sides 56 in place to prevent such spreading.

The construction thus provided is simple and economical to produce and use and lends itself to a great variety of applications. Moreover, the adjustability of the various elements of the equipment renders the construction extremely flexible and versatile in usage. It can, therefore, be employed in substantially any location wherein roller assemblies are required.

It will, of course, be understood that the size, arrangement and shape of the rollers, strips, and attaching means employed can be varied depending upon the particular location and usage of the invention contemplated. In view thereof, it should be understood that the particular embodiment of the invention shown in the drawings and described above is intended to be illustrative only and is not intended to limit the scope of the invention.

I claim:

1. A roller assembly comprising a channelled strip of material having a base and spaced parallel side portions, the base having roller receiving openings therein and the side portions having depressions therein centered with respect to said roller receiving openings, said depressions being inclined inwardly and upwardly toward the base of the strip, each depression having a trunnion receiving opening therein adjacent the upper portion of the depression, the lower side of each of said trunnion receiving openings being turned laterally and presenting an upwardly facing bearing surface and rollers positioned to project through said roller receiving openings and having trunnions formed integral with the rollers and extending into the trunnion receiving openings in the side portions and engaging said bearing surfaces.

2. A roller assembly comprising a channelled strip of material having a base and spaced parallel side portions, the base having roller receiving openings therein and the side portions having depressions therein centered with respect to said roller receiving openings, said depressions being inclined inwardly and upwardly toward the base of the strip, each depression having a trunnion receiving opening therein adjacent the upper portion of the depression, the lower side of each of said trunnion receiving openings being turned outwardly and presenting an upwardly facing bearing surface and rollers positioned to project through said roller receiving openings and having trunnions formed integral with the rollers and extending into the trunnion receiving openings in the side portions and engaging said bearings surfaces.

References Cited in the file of this patent

UNITED STATES PATENTS

| | | |
|---|---|---|
| 1,743,255 | Vervoort | Jan. 14, 1930 |
| 2,669,361 | Just | Feb. 16, 1954 |
| 2,739,540 | Woldring | Mar. 27, 1956 |
| 2,759,585 | Timmons et al. | Aug. 21, 1956 |
| 2,786,578 | DeGraaf et al. | Mar. 26, 1957 |